(12) United States Patent
Tamaoki

(10) Patent No.: US 7,561,325 B2
(45) Date of Patent: Jul. 14, 2009

(54) OPTICAL MODULE

(75) Inventor: Shinobu Tamaoki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 12/003,233

(22) Filed: Dec. 20, 2007

(65) Prior Publication Data
US 2008/0165413 A1    Jul. 10, 2008

Related U.S. Application Data

(60) Provisional application No. 60/935,812, filed on Aug. 31, 2007.

(30) Foreign Application Priority Data

Jan. 4, 2007 (JP) ............................ P2007-000181

(51) Int. Cl.
*H04B 10/17* (2006.01)
*H04B 10/12* (2006.01)

(52) U.S. Cl. ...................... 359/341.3; 359/337; 385/46; 385/48

(58) Field of Classification Search ................. 359/337, 359/341.31; 385/46, 48
See application file for complete search history.

(56) References Cited

U.S. PATENT DOCUMENTS

| 5,933,271 A * | 8/1999 | Waarts et al. | 359/341.31 |
| 6,078,422 A * | 6/2000 | Kosaka et al. | 359/341.3 |
| 6,366,393 B1 * | 4/2002 | Feulner et al. | 359/337 |
| 6,856,455 B2 * | 2/2005 | Naganuma et al. | 359/341.31 |
| 2008/0024859 A1 * | 1/2008 | Tamaoki | 359/341.31 |

FOREIGN PATENT DOCUMENTS

JP    2007-042981 A    2/2007

* cited by examiner

*Primary Examiner*—Eric Bolda
(74) *Attorney, Agent, or Firm*—Venable LLP; Michael A. Sartori; Justine A. Gozzi

(57) ABSTRACT

The present invention relates to an optical module that has a structure for protecting a pumping light source at a low cost. The optical module comprises an amplification optical fiber, an optical coupler, a pumping light source, a delay optical fiber, a seed light source, an optical fiber, a photodetector, an optical fiber, an optical isolator, an optical isolator, and a control section. Through the insertion of the delay optical fiber between the pumping light source and the optical coupler, the timing of the output control of the pumping light source which is carried out after the photodetector detects return light leads the timing with which the return light enters the pumping light source. Hence, the time with which the return light enters the pumping light source is shortened and the accumulative damage time of the pumping light source is reduced.

7 Claims, 15 Drawing Sheets

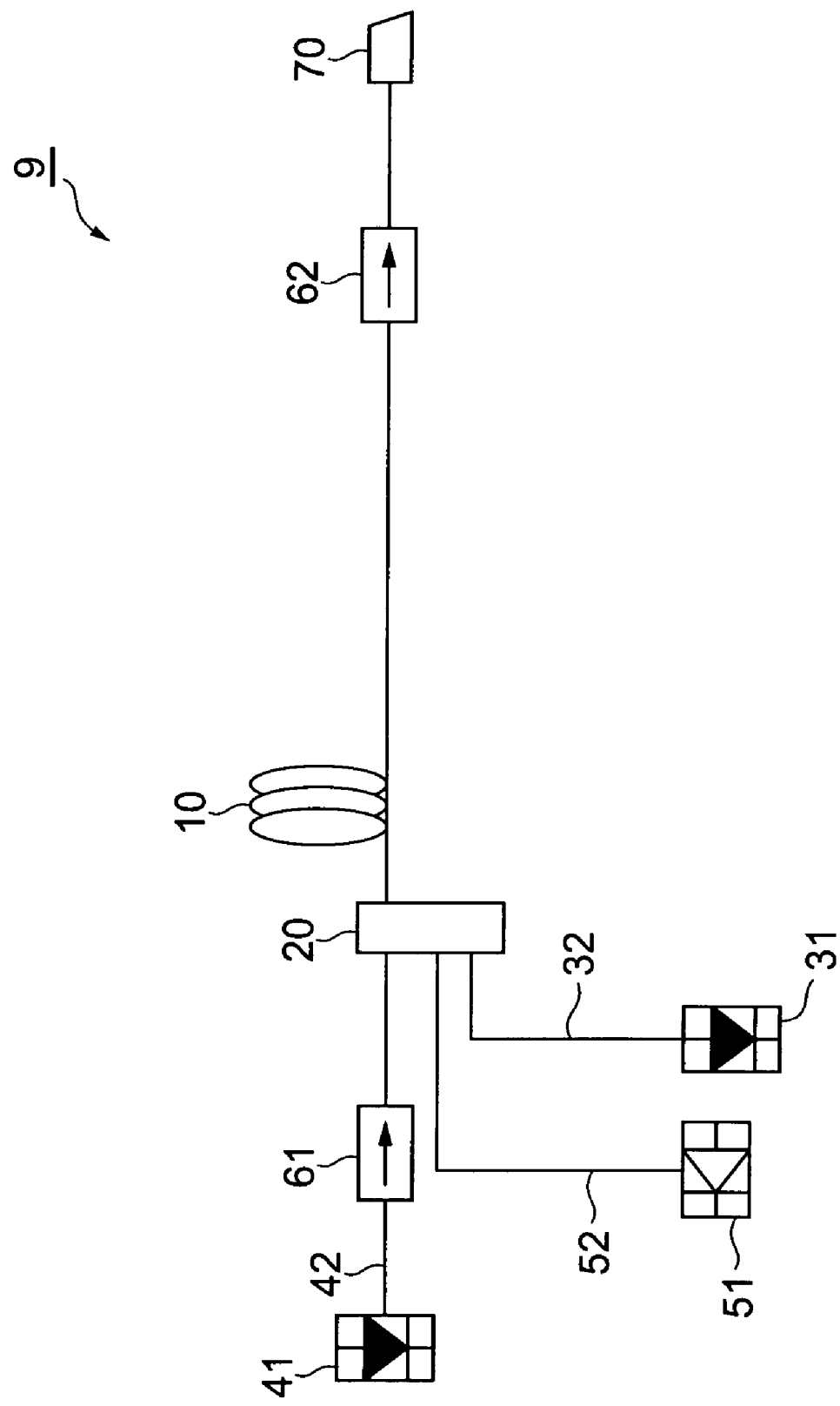

POWER OF RETURN LIGHT REACHING PUMPING LIGHT SOURCE 31

PROPAGATION TIME OF RETURN LIGHT | PROPAGATION DELAY TIME DUE TO DELAY FIBER 32

POWER OF RETURN LIGHT DETECTED BY PHOTODETECTOR 51

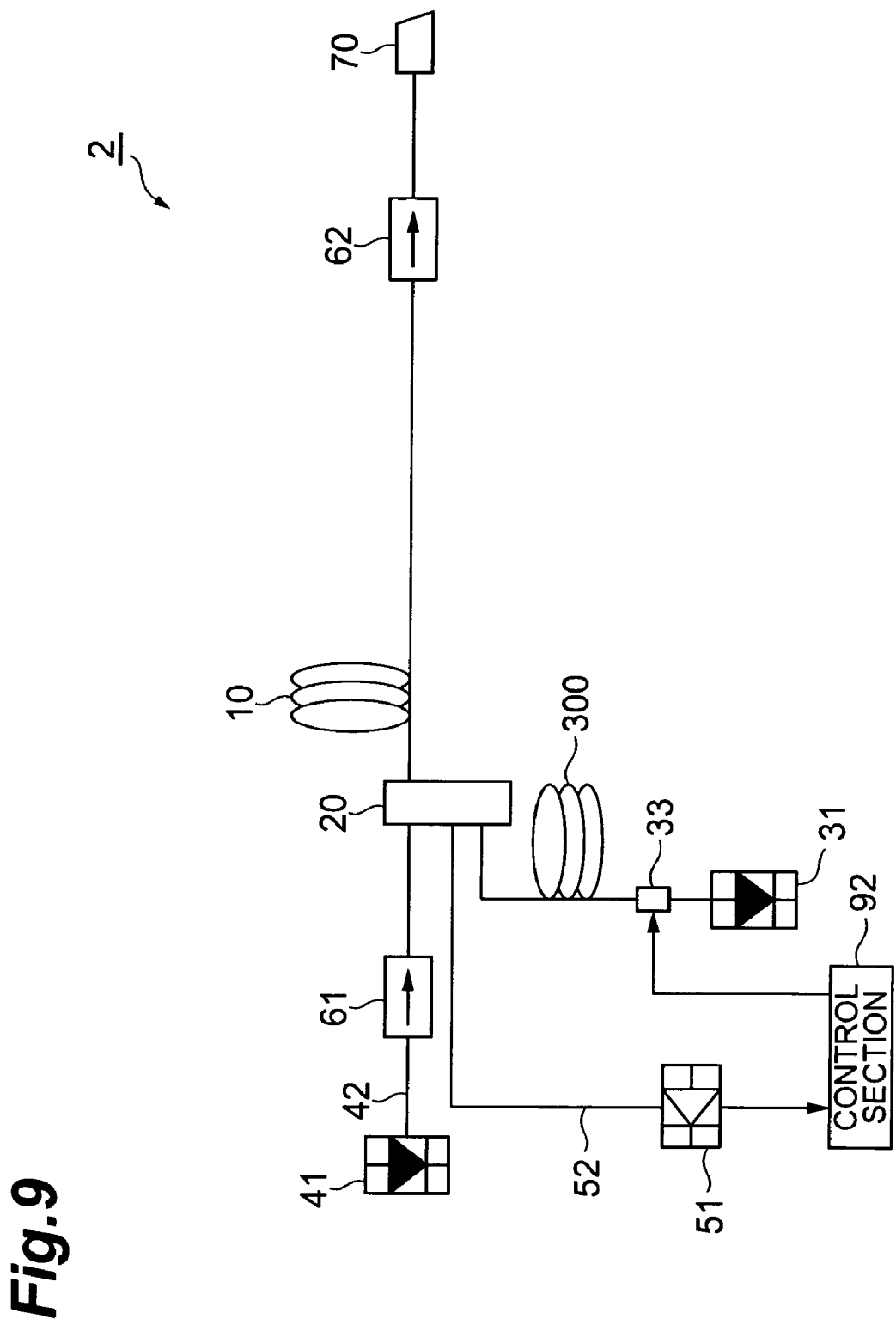

OPTICAL MODULE

CROSS-REFERENCE TO RELATED APPLICATION

This application claims priority to Provisional Application Ser. No. 60/935,812 filed on Aug. 31, 2007 by the same Applicant, which is hereby incorporated by reference in its entirety.

BACKGROUND OF THE INVENTION

1. Field of the Invention

The present invention relates to an optical module comprising an amplification optical fiber that amplifies seed light by the supply of pumping light.

2. Related Background Art

Currently, processing technology that employs laser light is attracting attention and there is a greater need for a high-power laser light source in the fields of processing and medicine. Examples of laser light sources that have attracted particular attention among the various laser light sources include fiber laser light sources. In a fiber laser light source, an amplification optical fiber whose core is doped with Yb, Er, Tm or another rare earth element is adopted as the light amplification medium. When pumping light is fed into the amplification optical fiber, seed light that propagates within the amplification optical fiber is amplified. As a result, high-power amplification light is outputted from the amplification optical fiber or laser light is outputted as a result of lasing. The advantage with a fiber laser light source is that it is easy to handle the laser light because the laser light is contained within the amplification optical fiber and large-scale cooling equipment is not required due to the high thermal radiation characteristic.

SUMMARY OF THE INVENTION

The inventors have studied prior arts in detail, and as a result, have found problems as follows. That is, in a conventional fiber laser light source, as a result of high-power light being generated within the amplification optical fiber, there are cases where light that propagates in the opposite direction from the normal light propagation direction such as reflected light caused by Rayleigh scatter within the amplification optical fiber and reflection by an optical device, and reflected light from the outgoing light also have a large amount of power. One point that warrants the utmost caution when such reverse-direction propagation light (return light) exists is the protection of the pumping light source by suppressing the light returning to the pumping light source.

In a constitution in which a single-mode optical fiber is adopted as the light propagation path between the light source of the seed light to be amplified (seed light source) and the amplification optical fiber, light returning to the seed light source can be suppressed by using an optical isolator or the like which is used most often in a normal band. However, a multi-mode optical fiber is often adopted in order to cause propagation of the high power pumping light to the light propagation path between the pumping light source and the amplification optical fiber. However, a multi-mode optical isolator is rare and extremely costly. Further, in a constitution in which a dielectric multilayered film filter or the like is inserted between the pumping light source and the amplification optical fiber, loss occurs in the high-power pumping light in the optical coupler and this is disadvantageous from the perspective of thermal radiation and the pumping efficiency.

In order to overcome the above-mentioned problems, it is an object of the present invention to provide an optical module having a structure for protecting the pumping light source at a low cost.

An optical module according to the present invention comprises an amplification optical fiber, a pumping light source, an optical coupler, a photodetector, a delay optical fiber, and a control section. The amplification optical fiber is an optical amplification medium that amplifies seed light with a predetermined wavelength (amplified light) that propagates within the amplification optical fiber in a state where pumping light is being supplied. The pumping light source outputs the pumping light to be supplied to the amplification optical fiber. The optical coupler is an optical device disposed between the amplification optical fiber and the pumping light source, and the optical coupler has a common port connected to one end of the amplification optical fiber and a plurality of optical I/O ports which implement a different function from the common port in accordance with the light propagation direction. That is, each of the plurality of optical I/O ports functions as an optical output port when the common port functions as an optical input port but functions as an optical input port when the common port functions as an optical output port. The delay optical fiber applies a delay time to the pumping light outputted from the pumping light source. Further, the delay optical fiber has one end optically connected to the pumping light source, and the other end optically connected to a first port among the plurality of optical I/O ports of the optical coupler. The photodetector is optically connected to a second port among the plurality of optical I/O ports of the optical coupler and detects light outputted from the second port. The control section controls at least one of an intensity of the seed light and an intensity of the pumping light inputted to the delay optical fiber, on the basis of the detection result of the photodetector. Further, by providing the delay optical fiber between the optical coupler and the pumping light source, an optical path length difference of one meter or more is provided between an optical path from the optical coupler to the pumping light source and an optical path from the optical coupler to the photodetector.

In the optical module, the pumping light outputted from the pumping light source is subjected to a predetermined delay by the delay optical fiber, whereupon same is inputted through the first port of the optical coupler and is supplied to the amplification optical fiber via the common port of the optical coupler. However, the return light generated within the amplification optical fiber moves from the first port of the optical coupler to the pumping light source via the delay optical fiber, and is also outputted from the second port of the optical coupler, and thereby being detected by the photodetector. The control section controls the entry of the pumping light or seed light to the amplification optical fiber on the basis of the result of the detection result by the photodetector such that the entry of the return light to the pumping light source can be suppressed.

In the optical module according to the present invention, the delay optical fiber preferably delays a part of return light reaching the pumping light source such that the timing with which the part of the return light generated within the amplification optical fiber reaches the pumping light source via the optical coupler lags the timing with which a part of return light generated within the amplification optical fiber reaches the photodetector via the optical coupler.

In the case of the optical module according to the present invention, the control section preferably controls the pumping light source such that, when the power of the light detected by the photodetector is greater than a predetermined value, the output of the pumping light from the pumping light source is stopped or the intensity of the pumping light from the pumping light source is reduced. Further, in this case, the delay optical fiber applies a delay time, which is longer than the time required from the timing of the light detection by the photodetector until the timing of the start of output control of the pumping light source by the control section, to the pumping light outputted from the pumping light source.

Thus, the delay, which is applied by the delay optical fiber to the pumping light outputted from the pumping light source, is longer than the time required from the light detection by the photodetector until the fluctuation in the output of the pumping light source. Hence, when the power of the light detected by the photodetector is greater than a predetermined value, the control section is able to stop the output of the pumping light from the pumping light source or reduce the intensity of the pumping light before the return light from the amplification optical fiber reaches the pumping light source (suppression of the entry of the return light to the pumping light source).

The optical module according to the present invention may also further comprise an optical device, provided between the pumping light source and the delay optical fiber, switching the propagation and blocking of light between the pumping light source and the delay optical fiber. In this case, the control section preferably controls the optical device such that, when the power of the light detected by the photodetector is greater than a predetermined value, the light propagates between the pumping light source and the delay optical fiber. Furthermore, the delay optical fiber applies a delay time, which is longer than the time required from the timing of the light detection by the photodetector until the timing of the start of the switching control of the optical device by the control section, to the pumping light outputted from the pumping light source.

Thus, in a constitution where an optical device that turns the light propagation between the pumping light source and delay optical fiber ON or OFF, the delay that is applied by the delay optical fiber to the pumping light outputted from the pumping light source is longer than the time required from the light detection by the photodetector until the light propagation of the optical device is turned OFF. Hence, when the power of the light detected by the photodetector is greater than a predetermined value, the entry of the return light to the pumping light source can be suppressed as a result of the control section turning OFF the light propagation of the optical device.

The optical module according to the present invention may further comprise a seed light source for outputting the seed light inputted to the amplification optical fiber. In this case, the control section preferably controls the seed light source such that, when the power of the light detected by the photodetector is greater than a predetermined value, the output of the seed light from the seed light source is stopped or the intensity of the seed light from the seed light source is reduced. Furthermore, the delay optical fiber applies a delay time, which is longer than the time required from the timing of the light detection by the photodetector until the timing of the start of output control of the seed light source by the control section, to the pumping light outputted from the pumping light source.

Thus, the delay that is applied by the delay optical fiber to the pumping light outputted from the pumping light source is longer than the time required from the light detection by the photodetector until the fluctuations in the output of the seed light source. Hence, when the power of the light detected by the photodetector is greater than a predetermined value, the entry of the return light to the pumping light source can be suppressed as a result of the control section stopping the output of the seed light from the seed light source or reducing the intensity of the seed light.

The optical module according to the present invention may also further comprise a seed light source for outputting the seed light; and a modulator for directly modulating or externally modulating the seed light from the seed light source. In this case, the control section preferably controls the modulator so that, when the power of the light detected by the photodetector is greater than a predetermined value, a modulation operation is stopped. Furthermore, the delay optical fiber applies a delay time, which is longer than the time required from the timing of the light detection by the photodetector until the timing of the stoppage of application voltage modulation of the seed light source by the control section, to the pumping light outputted from the pumping light source.

Thus, the delay, which is applied by the delay optical fiber to the pumping light outputted from the pumping light source, is longer than the time required from the light detection by the photodetector until the application voltage modulation of the seed light source is turned OFF. Hence, when the power of the light detected by the photodetector is greater than a predetermined value, the entry of the return light to the pumping light source can be suppressed as a result of the control section performing control to turn OFF the voltage modulation that is applied to the seed light source.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

BRIEF DESCRIPTION OF THE DRAWINGS

FIG. 1 shows the constitution of an optical module according to a comparative example;

FIG. 9 shows the constitution of a second embodiment of the optical module according to the present invention;

DETAILED DESCRIPTION OF THE PREFERRED EMBODIMENTS

Figure 2A:
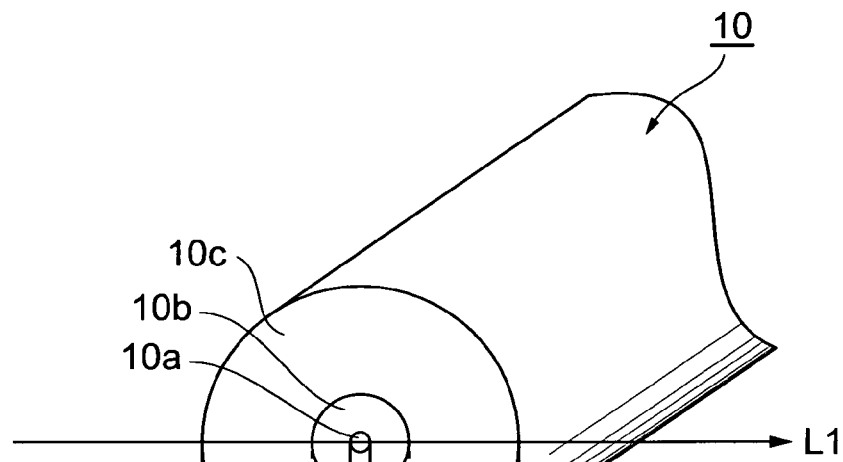
FIGS. 2A and 2B show the cross-sectional structure of an amplification optical fiber, and a refractive index profile respectively.

In the following, embodiments of the optical module according to the present invention will be described in detail with reference to FIGS. 1, 2A-2B, 3, 4A-4B, 5-6, 7A-8B, and 9-15. In the explanation of the drawings, constituents identical to each other will be referred to with numerals identical to each other without repeating their overlapping descriptions.

COMPARATIVE EXAMPLE

First, an optical module 9 of a comparative example will be described. FIG. 1 shows the constitution of the optical module according to the comparative example. The optical module 9 shown in FIG. 1 comprises an amplification optical fiber 10, an optical coupler 20, a pumping light source 31, an optical fiber 32, a seed light source 41, an optical fiber 42, a photodetector 51, an optical fiber 52, an optical isolator 61, and an optical isolator 62.

In the optical module 9, pumping light from the pumping light source 31 that is transmitted by the optical fiber 32 and seed light (amplified light) from the seed light source 41 that is transmitted by the optical fiber 42 and optical isolator 61 are multiplexed by the optical coupler 20. The multiplexed light from the optical coupler 20 is introduced to one end of the amplification optical fiber 10. In the amplification optical fiber 10 through which the pumping light and the seed light multiplexed each other propagates, the seed light is amplified by pumping a rare earth element (Yb, Er, Tm, Ho, Nd, Pr, Th, or the like) added into the amplification optical fiber 10. Further, the seed light amplified in the amplification optical fiber 10 is outputted toward the outside from the light emission end 70 after passing through the optical isolator 62 from the other end of the amplification optical fiber 10.

Figure 2B:
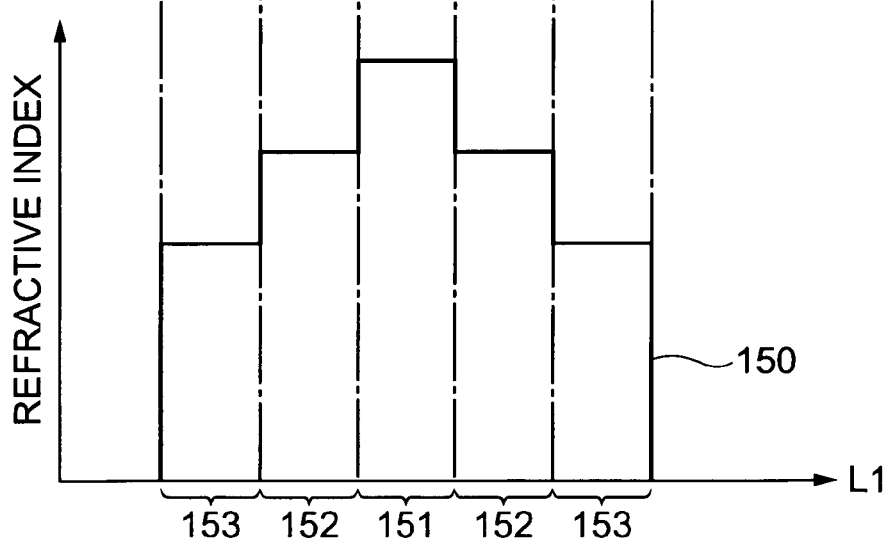

For example, as shown in FIG. 2A, the amplification optical fiber 10 comprises a core 10a having a predetermined refractive index and extending along a predetermined axis, a first cladding 10b provided on the outer periphery of the core 10a and having a lower refractive index than core 10a, and a second cladding 10c provided on the outer periphery of the first cladding 10b and having a lower refractive index than the first cladding 10b. FIG. 2B is a refractive index profile 150 in the radial direction L1 of the amplification optical fiber 10 (direction orthogonal to the optical axis of the amplification optical fiber 10), and the region 151 represents the refractive index in the radial direction L1 of the core 10a, the region 152 represents the refractive index in the radial direction L1 of the first cladding 10b, and the region 153 represents the refractive index in the radial direction L1 of the second cladding 153. The double cladding structure is constituted by the core 10a, the first cladding 10b, and the second cladding 10c. The core 10a causes single mode propagation of the seed light and the first cladding causes multi-mode propagation of the pumping light. The core 10a is doped with Yb at a concentration of 15000 wt.ppm and the seed light is amplified within the core 10a.

Figure 3:
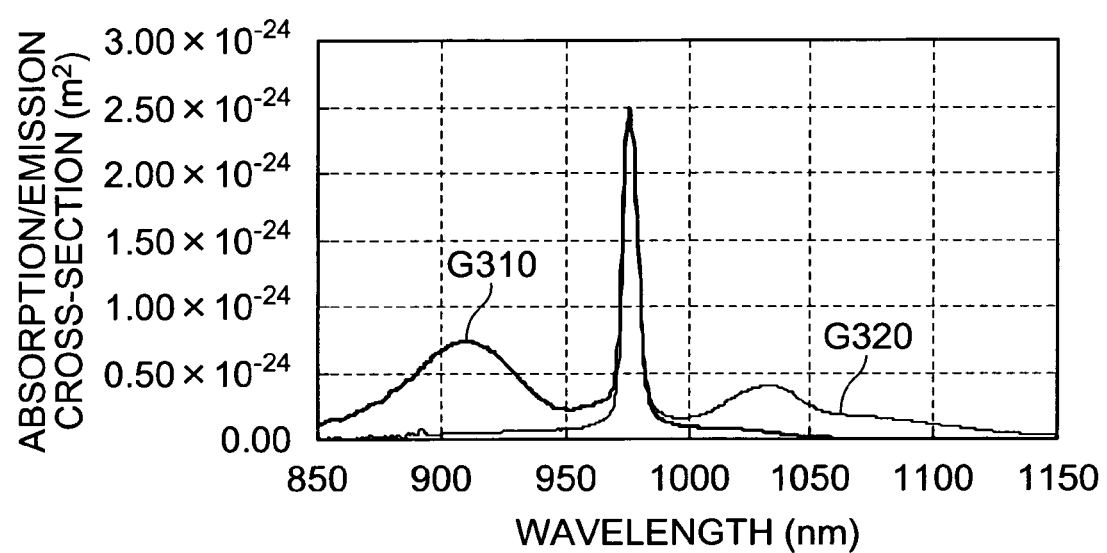
FIG. 3 is a graph that shows the absorption cross-section and emission cross-section of the amplification optical fiber as well as the respective wavelength dependence of the absorption cross-section and emission cross-section.

Furthermore, the amplification optical fiber 10 has wavelength dependency with respect to the absorption cross-section and emission cross-section shown in FIG. 3. The fiber length is nine meters. In FIG. 3, graph G310 represents the absorption cross-section and graph G320 represents the emission cross-section.

The pumping light source 31 includes a laser diode, for example. The wavelength of the pumping light outputted from the pumping light source 31 is 915 nm or 974 nm. The seed light source 41 includes a laser diode, for example. The wavelength of the seed light outputted from the seed light source 41 falls within the wavelength range of the 1030 to 1130 nm and is 1060 nm, for example.

Figure 4A:
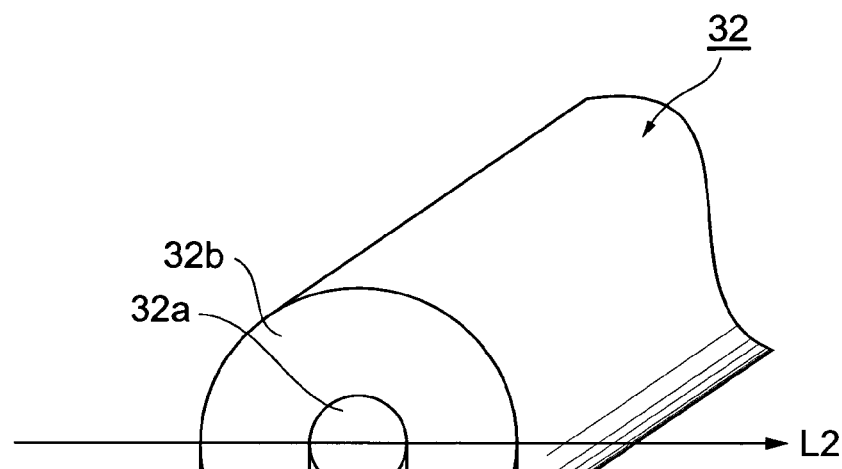
FIGS. 4A and 4B show the cross-sectional structure of an optical fiber inserted between the pumping light source and optical coupler, and a refractive index profile respectively.
Figure 4B:
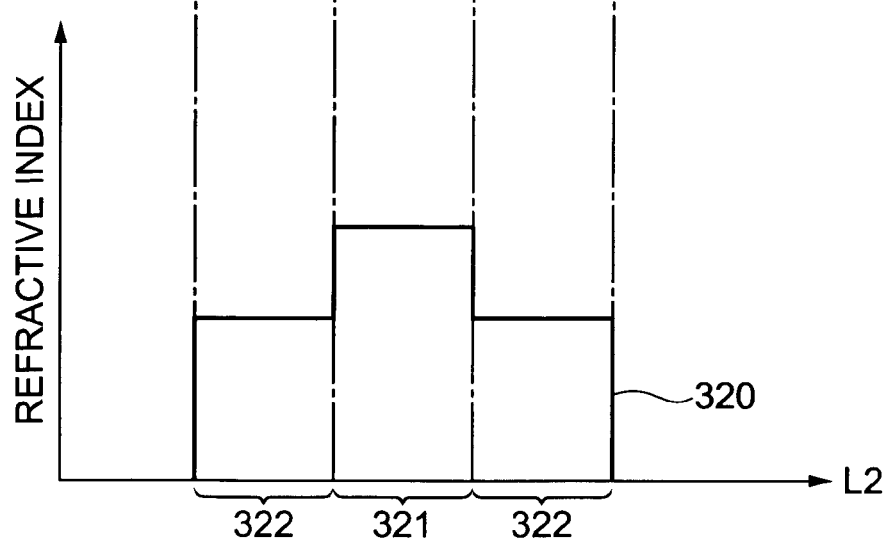

The optical fiber 32, provided between the pumping light source 31 and optical coupler 20, comprises a core 32a having a predetermined refractive index and extending along a predetermined axis, and a cladding 32b provided on the outer periphery of the core 32a and having a lower refractive index than that of the core 32a, as shown in FIG. 4A. Further, FIG. 4B is a refractive index profile 320 in radial direction L2 of the optical fiber 32 (the direction which is orthogonal to the optical axis of the optical fiber 32) and the region 321 represents the refractive index in the radial direction L2 of the core 32a, the region 322 represents the refractive index in the radial direction L2 of the cladding 32b. Further, core 32a subjects the pumping light outputted from the pumping light source 31 to multi-mode propagation.

Figure 5:
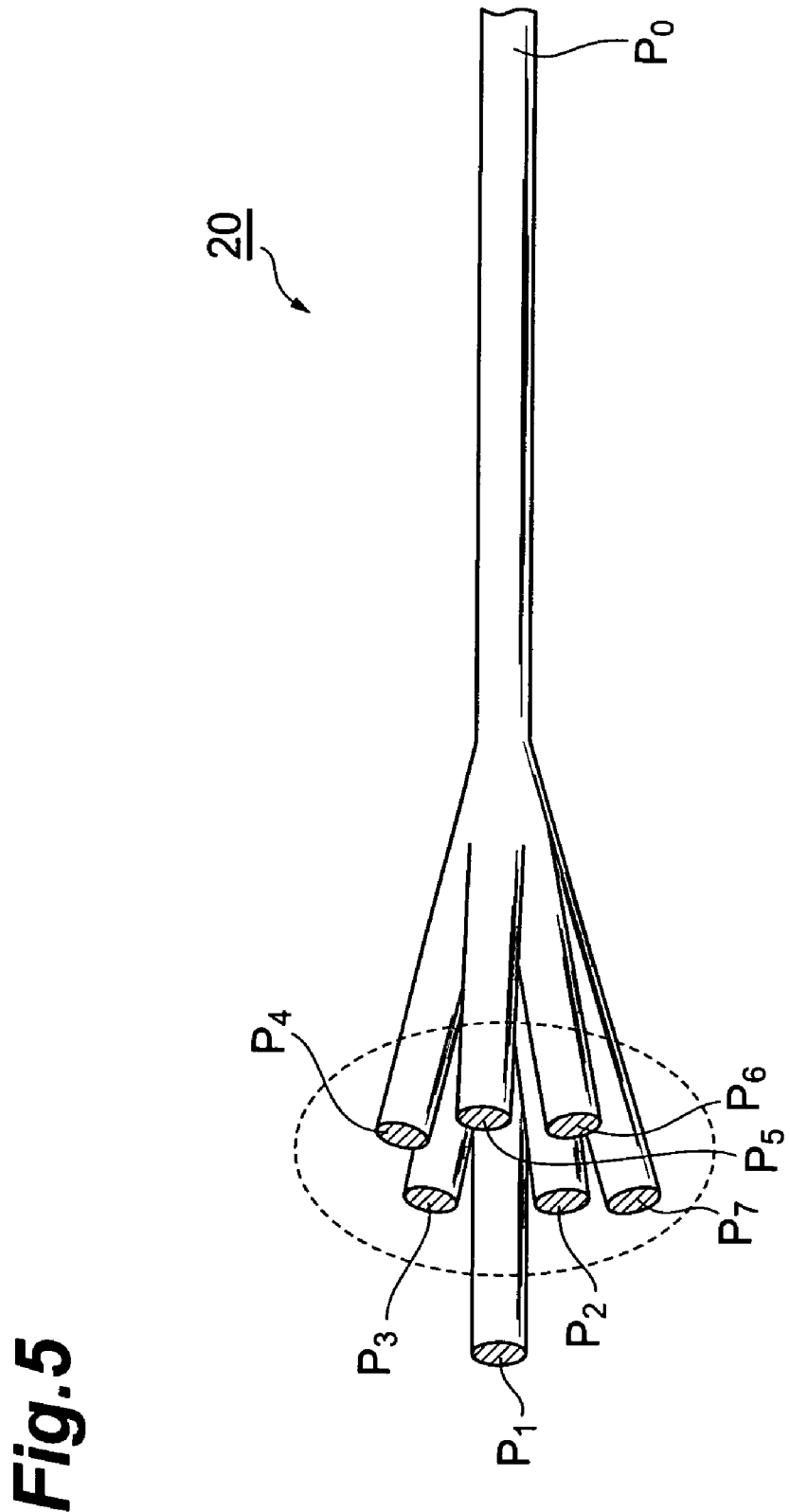
FIG. 5 serves to illustrate the constitution of the optical coupler.

FIG. 5 shows the constitution of the optical coupler 20. The optical coupler 20 shown in FIG. 5 has a plurality of optical I/O ports $P_1$ to $P_7$ (seven in the example shown in FIG. 5) on one side and a common port $P_0$ on the other side. The optical coupler 20 multiplexes the light input to the optical I/O ports $P_1$ to $P_7$ and outputs the multiplexed light from the common port $P_0$. On the other hand, the optical coupler 20 splits light inputted through the common port $P_0$ and outputs the respective split light from the optical I/O ports $P_1$ to $P_7$.

The optical fiber on the common port $P_0$ side of the optical coupler 20 has the same double cladding structure as the amplification optical fiber 10 and is connected to the amplification optical fiber 10. The optical I/O port $P_1$ is connected to the seed light source 41 via the optical fiber 42. The optical I/O port $P_2$ is connected to the pumping light source 31 via the optical fiber 32. In addition, the optical I/O port $P_3$ is connected to the photodetector 51 via the optical fiber 52. The other optical I/O ports $P_4$ to $P_7$ may also be connected to another pumping light source via another optical fiber.

In the optical module 9, when a part of the light to be outputted toward the outside from the light emission end 70 is reflected by the light emission end 70, the reflected light is blocked by the optical isolator 62, and therefore the reflected light does not enter the pumping light source 31. However, in cases where there is Rayleigh scatter upstream from the entry end of the optical isolator 62 or reflection at the connection point, the reflected light sometimes returns to the pumping light source 31. In such a case, the pumping light source 31 is sometimes damaged.

The light returning to the pumping light source 31 is split by the optical coupler 20 and reaches not only the pumping light source 31 but also the photodetector 51. Therefore, suppressing the input of the return light returning to the pumping light source 31 to protect the pumping light source 31 by taking a countermeasure such as stopping or reducing the pumping light output of the pumping light source 31 when return light is detected by the photodetector 51 may be considered.

However, even when such a countermeasure is taken, the difference in the lengths of the optical fibers 32 and 52 respectively linking the pumping light source 31 and photodetector 51 to the optical coupler 20 is generally less than one meter. In such a constitution, the timing for controlling the output of the pumping light source 31 after the return light is detected by the photodetector 51 lags the timing with which the return light enters the pumping light source 31. For this reason, the time taken for the return light to enter the pumping light source 31 is long and the accumulative damage time of the pumping light source 31 is large.

The problem where the pumping light source sustains damage from the return light from the amplification optical fiber 10 arises not only in the above case of forward pumping but also in cases of backward pumping and bidirectional pumping. The respective embodiments of the optical module according to the present invention which are described hereinbelow suppress the abovementioned problem of the pumping light source sustaining damage from the return light.

First Embodiment

Figure 6:
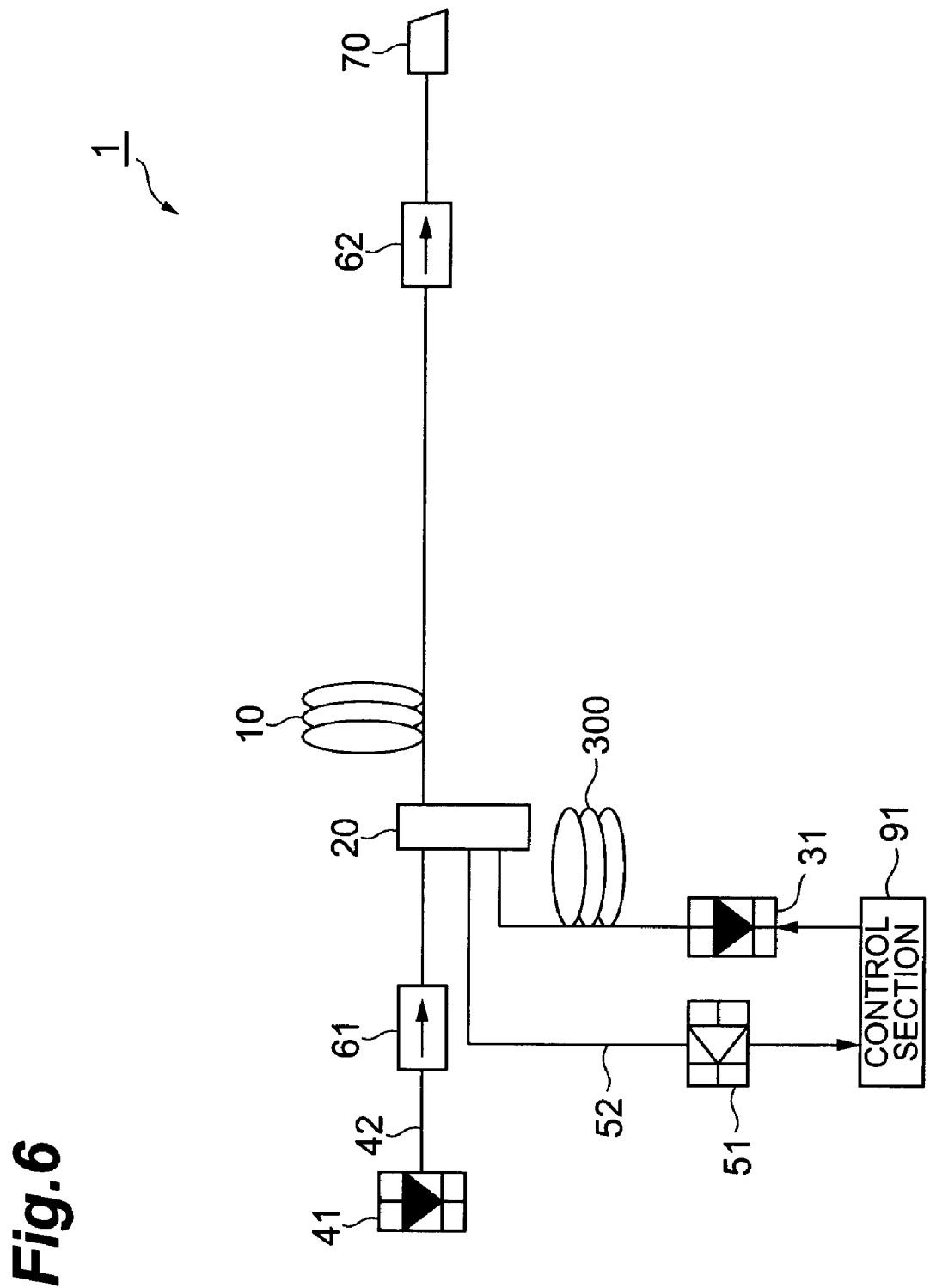
FIG. 6 shows the constitution of a first embodiment of the optical module according to the present invention.

Subsequently, a first embodiment of the optical module according to the present invention will be described. FIG. 6 shows the constitution of the first embodiment of the optical module according to the present invention. The optical module 1 shown in FIG. 6 comprises an amplification optical fiber 10, an optical coupler 20, an pumping light source 31, a delay optical fiber 32, a seed light source 41, an optical fiber 42, a photodetector 51, an optical fiber 52, an optical isolator 61, an optical isolator 62, and a control section 91.

As compared with the constitution of the optical module 9 according to the comparative example shown in FIG. 1, the optical module 1 according to the first embodiment shown in FIG. 6 differs in that a delay optical fiber 300 having a desired length is provided between the pumping light source 31 and optical coupler 20. Further, the comparative example differs from the first embodiment also in that the comparative example comprises control section 91.

The delay optical fiber 300 keeps the connection loss of a pigtail optical fiber that extends from the pumping light source 31 small and, therefore, desirably has the same structure as that of the pigtail optical fiber. The optical fiber 52 provided between the photodetector 51 and optical coupler 20 also desirably has the same structure as that of the pigtail optical fiber that extends from the pumping light source 31. The delay optical fiber 300 may also have the same cross-section structure and refractive index profile (see FIGS. 4A and 4B) as those of the optical fiber 32 of the optical module 9 and the optical fiber 52 may also have the cross-section structure and refractive index profile shown in FIGS. 4A and 4B. In general, because the length variation of the optical fiber that extends from the optical coupler 20 is less than one meter, it is said that the delay optical fiber 300 is inserted in cases where the difference between the optical path length from the pumping light source 31 to the optical coupler 20 and the optical path length from the optical coupler 20 to the photodetector 51 is equal to or more than one meter.

In the optical module 1 according to the first embodiment, because the delay optical fiber 300 having the desired length is inserted between the pumping light source 31 and the optical coupler 20, the timing for controlling the output of the pumping light source 31 after the return light is detected by the photodetector 51 leads the timing with which the return light enters the pumping light source 31. Hence, the time taken by the return light to enter the pumping light source 31 is shortened and the accumulative damage time of the pumping light source 31 is reduced. Thus, the pumping light source 31 can be protected by means of an inexpensive constitution.

Because the delay optical fiber 300 having the desired length is inserted between the pumping light source 31 and the optical coupler 20, the supply timing of the pumping light with respect to the amplification optical fiber 10 is delayed. However, this does not mean that control whereby the pumping light is changed at high speed in sync with the seed light response is required. Hence, the timing of the seed light and pumping light which enter the amplification optical fiber 10 need not be synchronized.

Figure 7A:
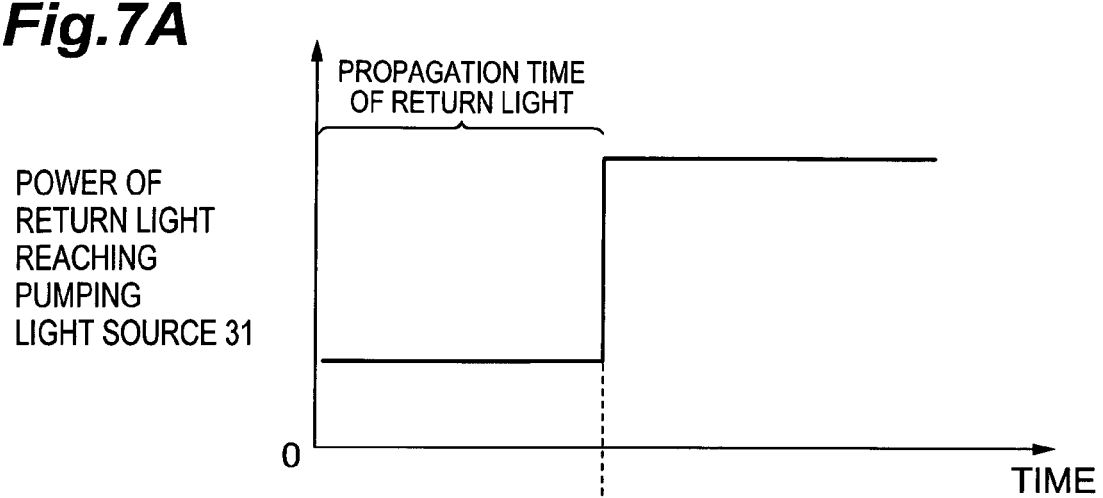
FIGS. 7A and 7B are time charts serving to illustrate the operation of the optical module according to the comparative example.
Figure 7B:
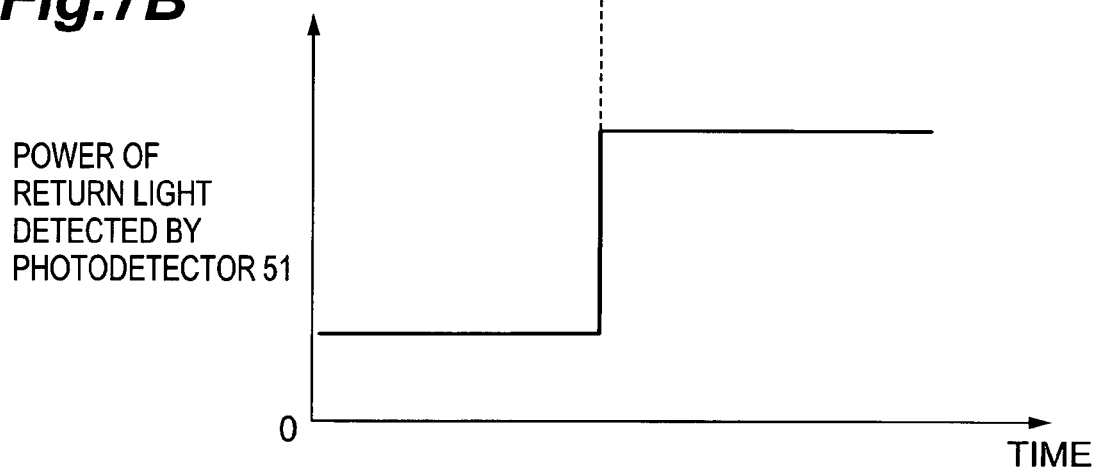
Figure 8A:
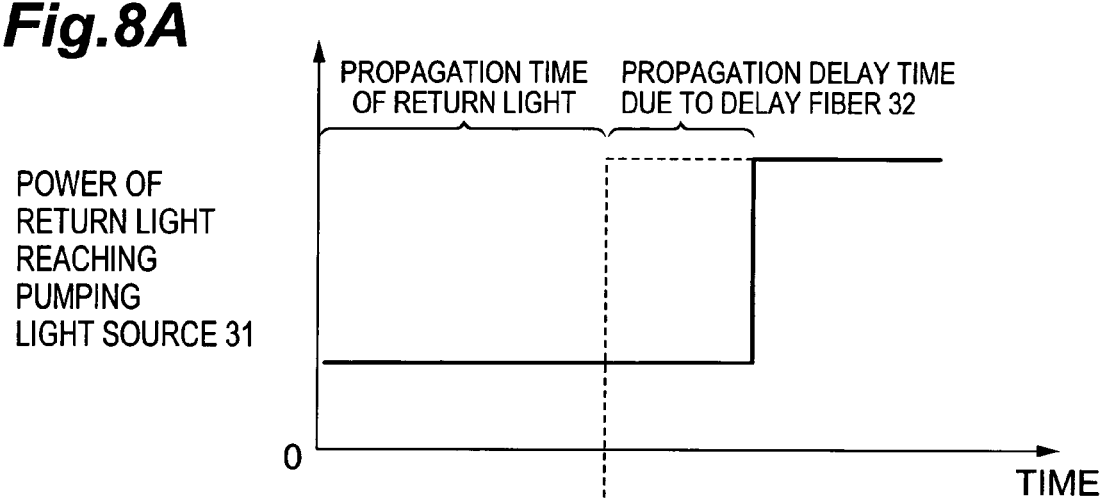
FIGS. 8A and 8B are time charts serving to illustrate the operation of the optical module according to the first embodiment.
Figure 8B:
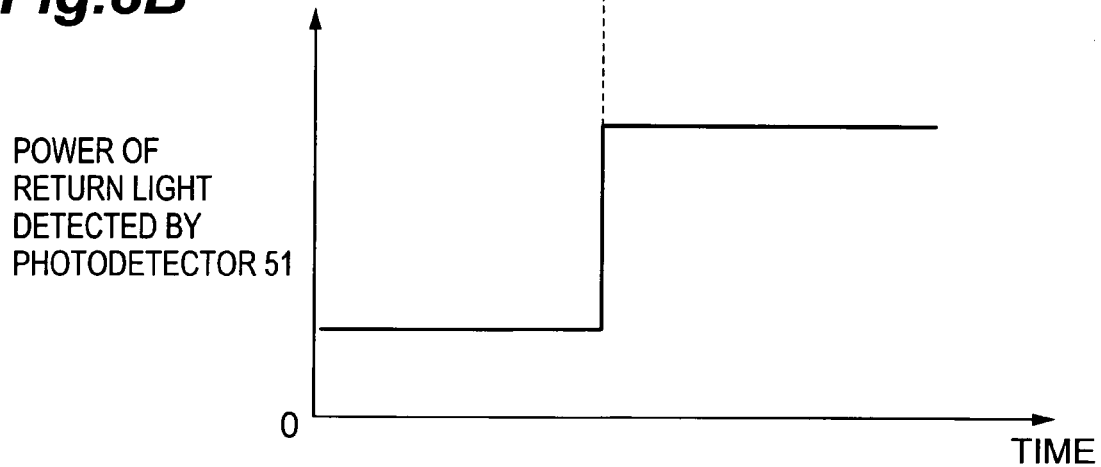

Next, the operation of the optical module 1 according to the first embodiment will be described in comparison with the operation of the optical module 9 according to the comparative example. FIGS. 7A and 7B are time charts that serve to illustrate the operation of the optical module 9 according to the comparative example. Further, FIGS. 8A and 8B are time charts that serve to illustrate the operation of the optical module 1 according to the first embodiment. FIG. 7A and FIG. 8A show the temporal change in the power of the return light returning to the pumping light source 31 and FIG. 7B and FIG. 8B show the temporal change in the power of the return light returning to the photodetector 51.

As shown in FIGS. 7A and 7B, in the optical module 9 according to the comparative example, the timing with which the return light reaches the pumping light source 31 and photodetector 51 respectively is substantially the same. Even when the length variation of the optical fiber that extends from the optical coupler 20 is one meter, there is only a difference of about 5 nanoseconds in the timing with which the return light reaches the pumping light source 31 and photodetector 51 respectively. The control time when the output of the pumping light source 31 is to be controlled starting with the control after the photodetector 51 detects the return light is approximately 0.1 µs in an analog circuit and on the order of approximately 1 µs in a high-speed digital circuit. When the control time is considered, the length variation of the optical fiber that extends from the optical coupler 20 is substantially equal to zero.

However, as shown in FIGS. 8A and 8B, in the optical module 1 according to the first embodiment, supposing that the length of the delay optical fiber 300 is 200 meters, for example, there is a difference of approximately 1 µs in the timing with which the return light reaches the pumping light source 31 and photodetector 51 respectively. Therefore, the return light can be detected by the photodetector 51 one microsecond before the timing with which the return light reaches the pumping light source 31. That is, the control section 91 is able to perform some kind of control action prior to reaching the pumping light source 31.

Therefore, according to the first embodiment, the control section 91 stops the output of pumping light from the pumping light source 31 or reduces the intensity thereof when the power of the return light detected by the photodetector 51 is greater than a predetermined value. Further, the delay optical fiber 32 applies a delay time, which is longer than the time required from the detection of the return light of the photodetector 51 until the fluctuation in the output of the pumping light source 31, to the pumping light outputted from the pumping light source 31. In the first embodiment, the pumping light source 31 can thus be protected with an inexpensive constitution.

Second Embodiment

Next, a second embodiment of the optical module according to the present invention will be described. FIG. 9 shows the constitution of the second embodiment of the optical module according to the present invention. The optical module 2 shown in FIG. 9 comprises an amplification optical fiber 10, an optical coupler 20, a pumping light source 31, a delay optical fiber 300, an optical device 33, a seed light source 41, an optical fiber 42, a photodetector 51, an optical fiber 52, an optical isolator 61, an optical isolator 62, and a control section 92.

In comparison with the constitution of the optical module 1 according to the first embodiment shown in FIG. 6, the optical module 2 according to the second embodiment shown in FIG. 9 differs in that the optical device 33 is provided between the pumping light source 31 and delay optical fiber 300. In addition, the second embodiment differs from the first embodiment in that the control section 92 is provided in place of the control section 91.

The optical device 33 is provided between the pumping light source 31 and delay optical fiber 300 and is able to turn the propagation of the pumping light and return light ON or OFF (transmit or block the return light). An optical switch or high-speed variable optical attenuator, for example, can be applied as this optical device 33. The control section 92 turns OFF the light propagation of the optical device 33 when the power of the return light detected by the photodetector 51 is greater than a predetermined value. Further, the delay optical fiber 300 applies a delay time, which is longer than the time required from the detection of the return light by the photodetector 51 until the light propagation of the optical device 33 is turned OFF, to the pumping light outputted from the pumping light source 31. Thus, in accordance with the second embodiment, because the entry of the return light to the pumping light source 31 is suppressed, the pumping light source 31 can be protected with an inexpensive constitution.

Further, in accordance with the second embodiment, by completely turning OFF the light propagation by the optical device 33, the forward propagation light from the pumping light source 31 is also blocked and there is a risk of heat accumulation in the optical device 33. However, the risk of thermal accumulation in the optical device 33 can also be avoided by incorporating control of the reduction in the output of the pumping light source 31 after blocking the return light by means of optical device 33.

Third Embodiment

Figure 10:
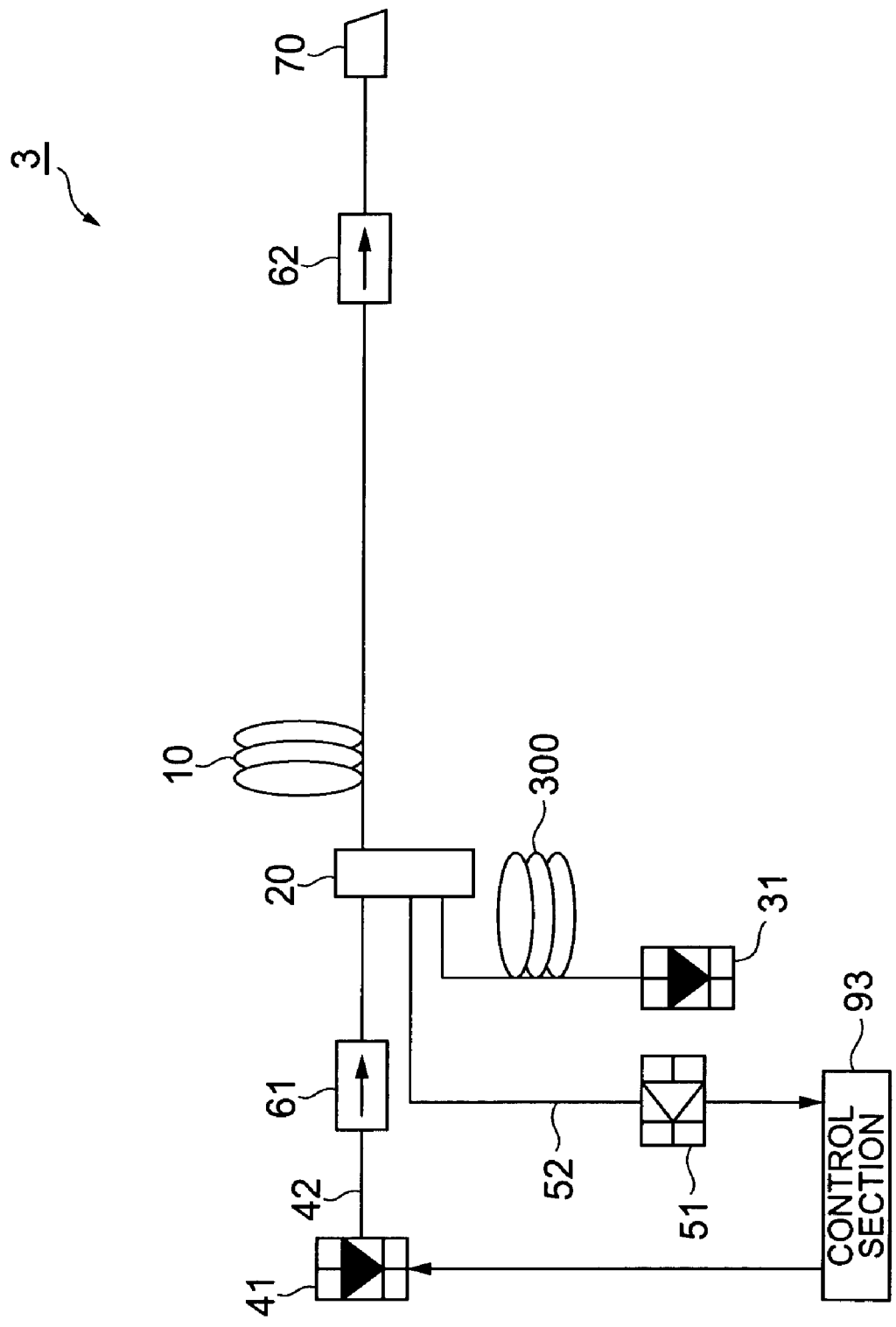
FIG. 10 shows the constitution of a third embodiment of the optical module according to the present invention.

Next, a third embodiment of the optical module according to the present invention will be described. FIG. 10 shows the constitution of the third embodiment of the optical module according to the present invention. The optical module 3 shown in FIG. 10 comprises an amplification optical fiber 10, an optical coupler 20, a pumping light source 31, a delay optical fiber 300, a seed light source 41, an optical fiber 42, a photodetector 51, an optical fiber 52, an optical isolator 61, an optical isolator 62, and a control section 93.

In comparison with the constitution of the optical module 1 according to the first embodiment shown in FIG. 6, the optical module 3 according to the third embodiment shown in FIG. 10 differs in that the third embodiment comprises a control section 93 in place of the control section 91.

In accordance with the third embodiment, the control section 93 stops the output of the seed light source 41 which outputs seed light or reduces the intensity thereof when the power of the return light detected by the photodetector 51 is greater than a predetermined value. Furthermore, the delay optical fiber 300 supplies a delay time, which is longer than the time required from the detection of the return light by the photodetector 51 until the fluctuation in the output of the seed light source 41, to the pumping light outputted from the pumping light source 31. Thus, in accordance with the third embodiment, the entry of the light returning to the pumping light source 31 is suppressed and the pumping light source 31 can be protected with an inexpensive constitution.

Fourth Embodiment

Figure 11:
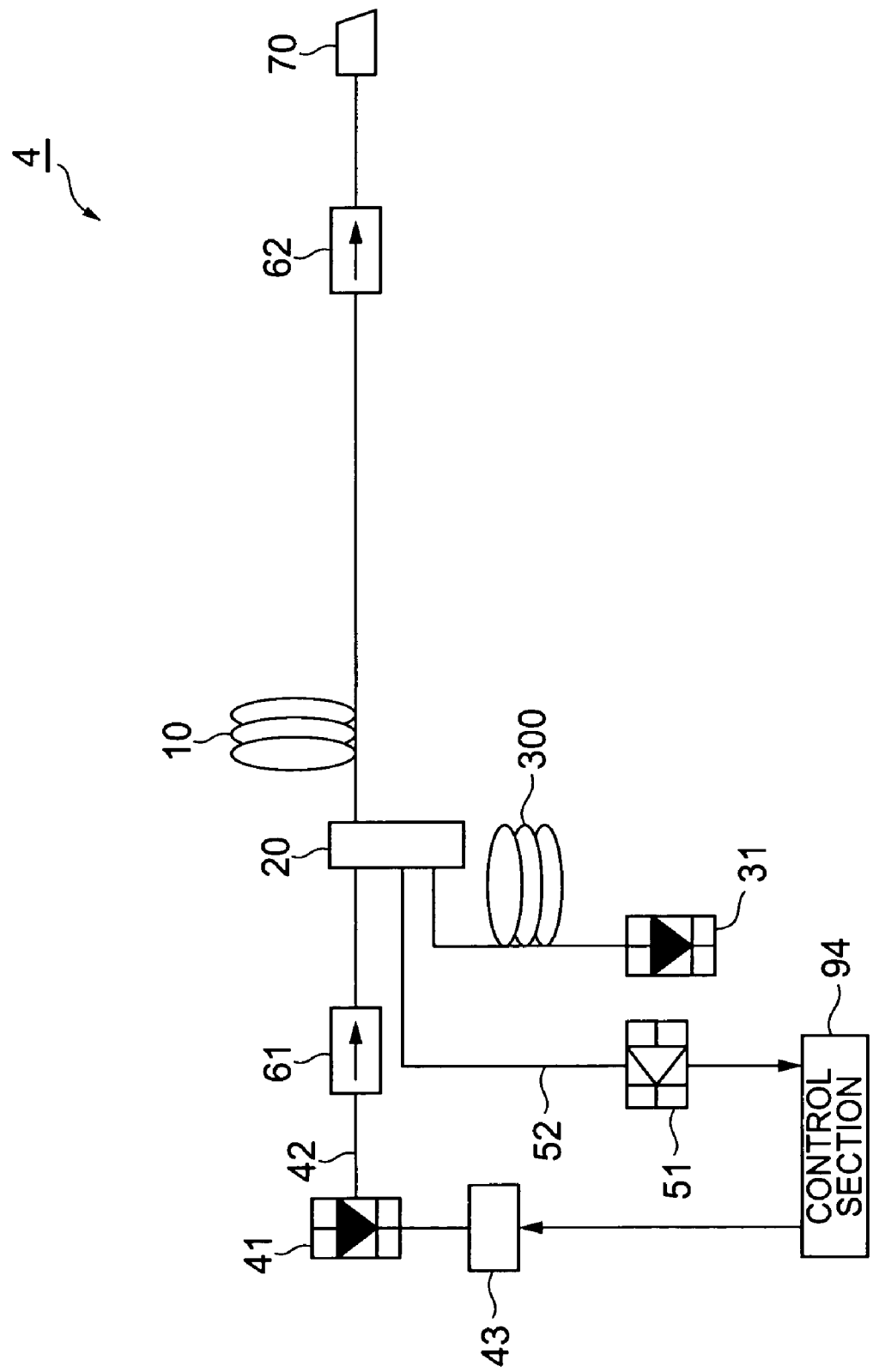
FIG. 11 shows the constitution of a fourth embodiment of the optical module according to the present invention.

Next, a fourth embodiment of the optical module according to the present invention will be described. FIG. 11 shows the constitution of the fourth embodiment of the optical module according to the present invention. The optical module 4 shown in FIG. 11 comprises an amplification optical fiber 10, an optical coupler 20, a pumping light source 31, a delay optical fiber 300, a seed light source 41, an optical fiber 42, a modulator 43, a photodetector 51, an optical fiber 52, an optical isolator 61, an optical isolator 62, and a control section 94.

In comparison with the constitution of the optical module 3 according to the third embodiment shown in FIG. 10, the optical module 4 according to the fourth embodiment shown in FIG. 11 differs in that same comprises the modulator 43. In addition, the fourth embodiment differs from the third embodiment in that same comprises the control section 94 in place of the control section 93.

The modulator 43 applies direct modulation to the seed light source 41 which outputs seed light. The control section 94 turns OFF the voltage modulation which is applied to the seed light source 41 by controlling the modulator 43 when the power of the return light detected by the photodetector 51 is greater than a predetermined value. In this case, the seed light outputted from the seed light source 41 is continuous light. In addition, the delay optical fiber 300 applies a delay time, which is longer than the time required from the detection of the return light of the photodetector 51 until the application voltage modulation of the seed light source 41 is turned OFF, to the pumping light outputted from the pumping light source 31. Thus, in accordance with the fourth embodiment, the entry of the return light to the pumping light source 31 is suppressed and the pumping light source 31 can thus be protected with an inexpensive constitution.

Fifth Embodiment

Figure 12:
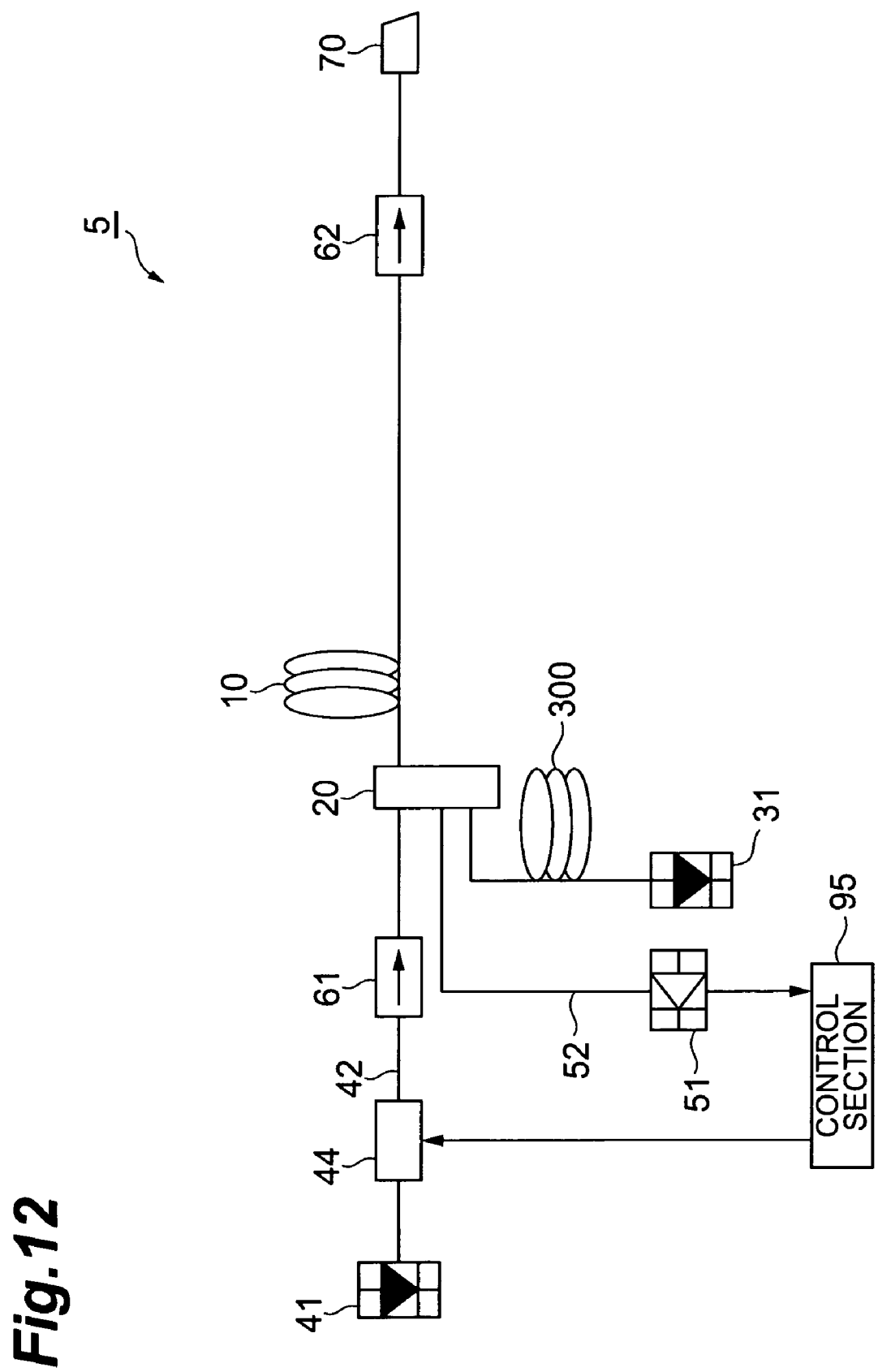
FIG. 12 shows the constitution of a fifth embodiment of the optical module according to the present invention.

Next, a fifth embodiment of the optical module according to the present invention will be described. FIG. 12 shows the constitution of the fifth embodiment of the optical module according to the present invention. The optical module 5 shown in FIG. 12 comprises an amplification optical fiber 10, an optical coupler 20, a pumping light source 31, a delay optical fiber 300, a seed light source 41, an optical fiber 42, a modulator 44, a photodetector 51, an optical fiber 52, an optical isolator 61, an optical isolator 62, and a control section 95.

In comparison with the constitution of the optical module 4 according to the fourth embodiment shown in FIG. 11, the optical module 5 according to the fifth embodiment shown in FIG. 12 differs in that same comprises the modulator 44 in place of modulator 43. In addition, the fifth embodiment differs from the fourth embodiment in that same comprises the control section 95 in place of the control section 94.

The modulator 44 applies external modulation to the seed light outputted from the seed light source 41. The control section 95 turns OFF the modulation of the modulator 44 by controlling the modulator 44 when the power of the return light detected by the photodetector 51 is greater than a predetermined value. In this case, the seed light outputted from the modulator 44 is continuous light. In addition, the delay optical fiber 300 applies a delay time, which is longer than the time required from the detection of the return light of the photodetector 51 until the modulation of the modulator 44 is turned OFF, to the pumping light outputted from the pumping light source 31. Thus, in accordance with the fifth embodiment, the entry of the return light to the pumping light source 31 is suppressed and the pumping light source 31 can thus be protected with an inexpensive constitution.

First and Second Modified Examples

Figure 13:
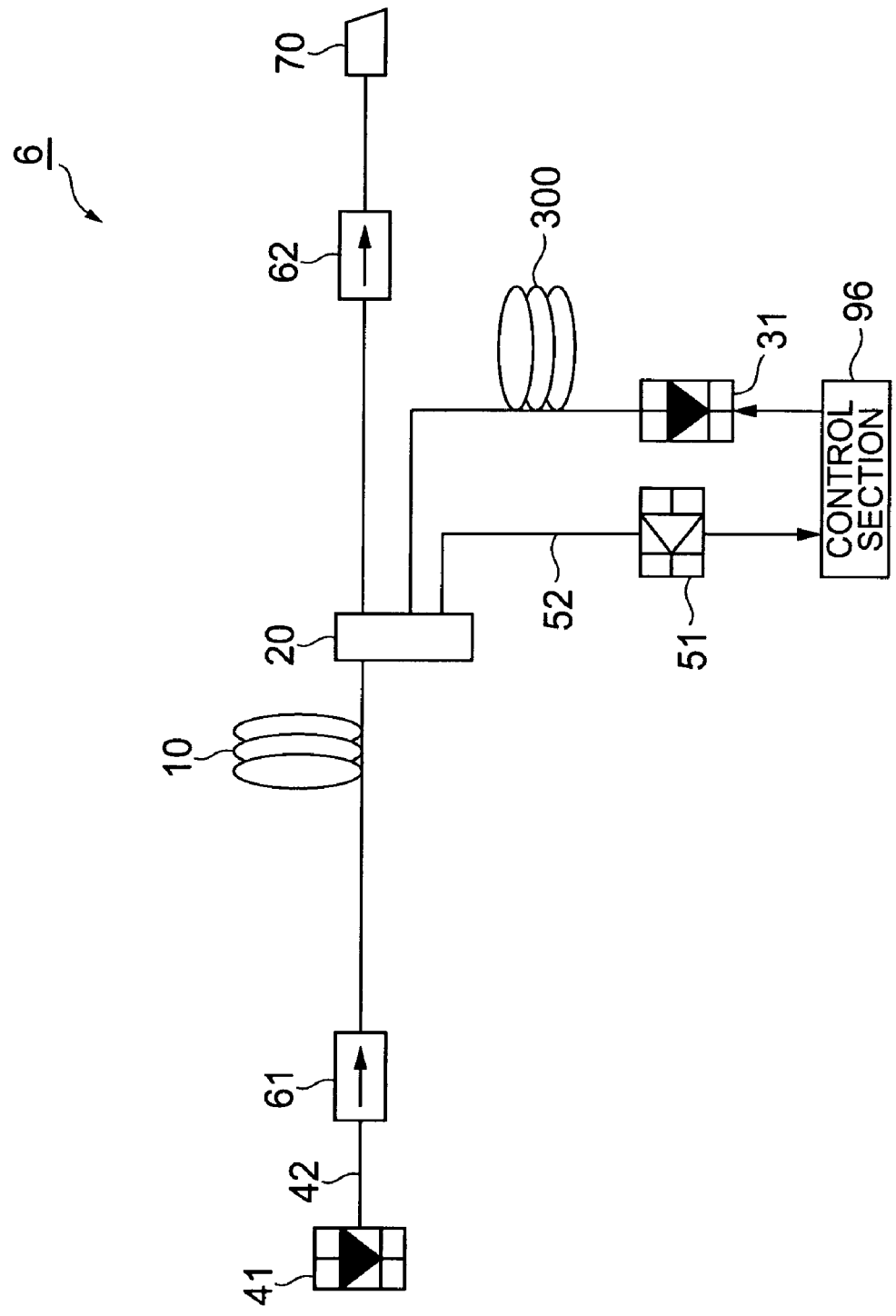
FIG. 13 shows the constitution of the optical module according to a first modified example as a modified example for each embodiment of the optical module according to the present invention.

The present invention is not limited to the above embodiments and a variety of modifications are possible. For example, the optical modules 1 to 4 according to the first to fourth embodiments have a forward pumping constitution that propagates pumping light in the same direction as the propagation direction of the seed light in the amplification optical fiber 10. However, the optical module according to the present invention may also have a backward pumping constitution that propagates pumping light in the opposite direction from the propagation direction of the seed light in the amplification optical fiber 10, as shown in FIG. 13. Furthermore, the optical module according to the present invention may also have a bidirectional pumping constitution that propagates pumping light in two directions within the amplification optical fiber 10 as shown in FIG. 14.

FIG. 13 shows the constitution of the optical module according to the first modified example as a modified example of each embodiment of the optical module according to the present invention. In comparison with the constitution of the optical module 1 according to the first embodiment shown in FIG. 6, the optical module 6 according to the first modified example shown in FIG. 13 differs in that same constitutes a change from a forward pumping system to a backward pumping system. That is, because this system is a backward pumping system, the optical coupler 20 is inserted between the amplification optical fiber 10 and the optical isolator 62. In addition, a control section 96 stops the output of the pumping light from the pumping light source 31 or reduces the intensity thereof when the power of the return light detected by the photodetector 51 is greater than a predetermined value.

Figure 14:
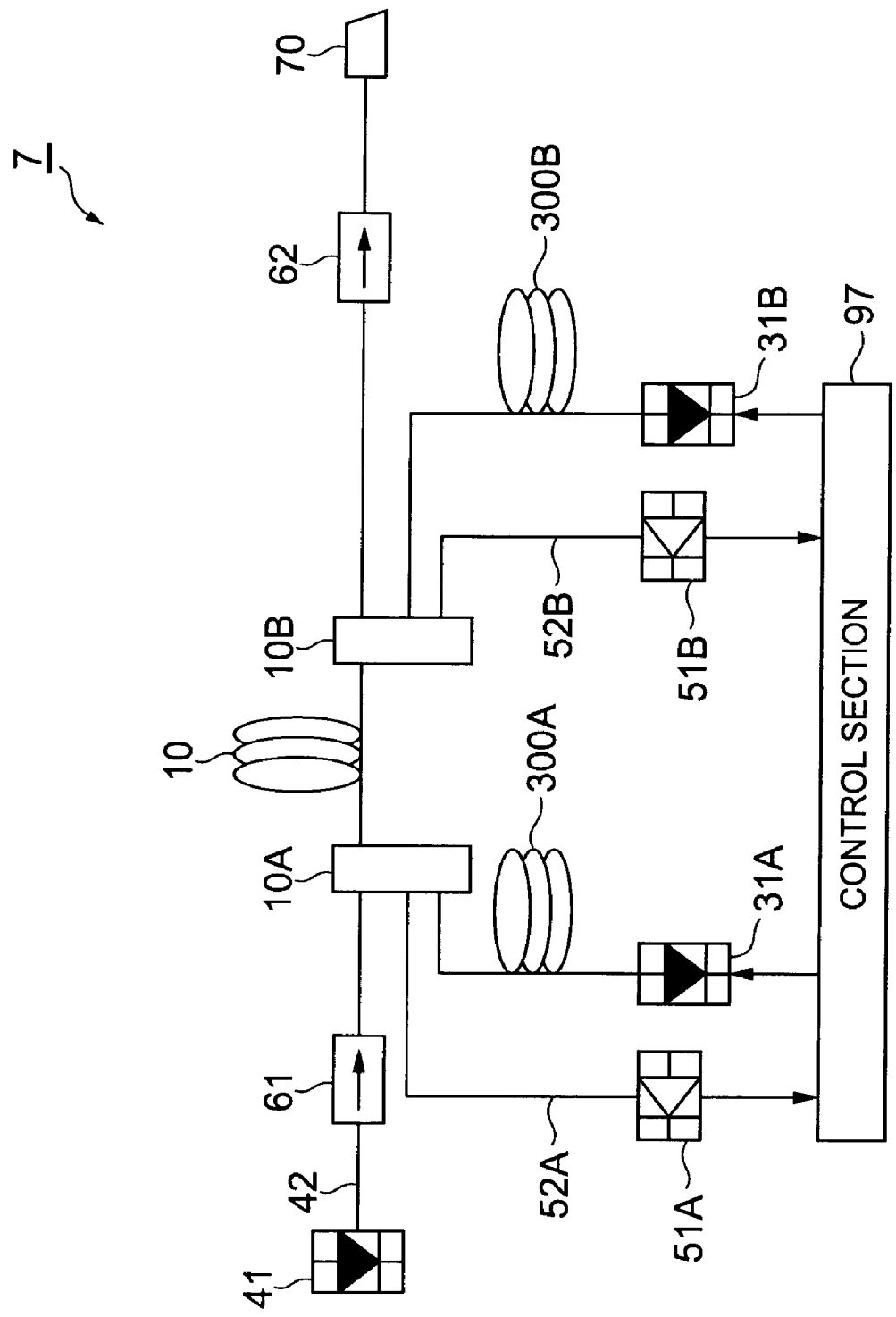
FIG. 14 shows the constitution of the optical module according to a second modified example as a modified example for each embodiment of the optical module according to the present invention.

FIG. 14 shows the constitution of the optical module according to the second modified example as a modified example of each embodiment of the optical module according to the present invention. In comparison with the constitution of the optical module 1 according to the first embodiment shown in FIG. 6, the optical module 7 according to the second modified example shown in FIG. 14 differs in that the pumping system has been changed from a forward pumping system to a backward pumping system. That is, in order to implement a forward pumping system, an optical coupler 20A is inserted between the optical isolator 61 and the amplification optical fiber 10 and a pumping light source 31A is connected via a delay optical fiber 300A to the optical coupler 20A, and a photodetector 51A is connected via an optical fiber 52A to the optical coupler 20A. However, in order to implement backward pumping, an optical coupler 20B is inserted between the amplification optical fiber 10 and the optical isolator 62 and a pumping light source 31B is connected via a delay optical fiber 300B to the optical coupler 20B, and a photodetector 51B is connected via an optical fiber 52B to the optical coupler 20B. A control section 97 stops the output of the pumping light from the pumping light source 31A or reduces the intensity thereof when the power of the return light detected by the photodetector 51A is greater than a predetermined value. In addition, the control section 97 stops the output of the pumping light from the pumping light source 31B or reduces the intensity thereof when the power of the return light detected by the photodetector 51B is greater than a predetermined value.

As per the first embodiment, the optical modules 6 and 7 according to the first and second modified examples shown in FIGS. 13 and 14 stop the output of the pumping light from the pumping light source 31 or reduces the intensity thereof when the power of the return light detected by the photodetector 51 is greater than a predetermined value. In addition, as per each of the second to fourth embodiments, when the power of the return light detected by the photodetector 51 is greater than a predetermined value, the optical modules 6 and 7 according to the first and second modified examples may turn OFF the light propagation of the optical device 33 provided between the pumping light source 31 and the delay optical fiber 300, stop the output of the seed light source 41 or reduce the intensity thereof, and turn OFF the voltage modulation that is applied to the seed light source 41 by controlling the modulator 43.

Third Modified Example

Figure 15:
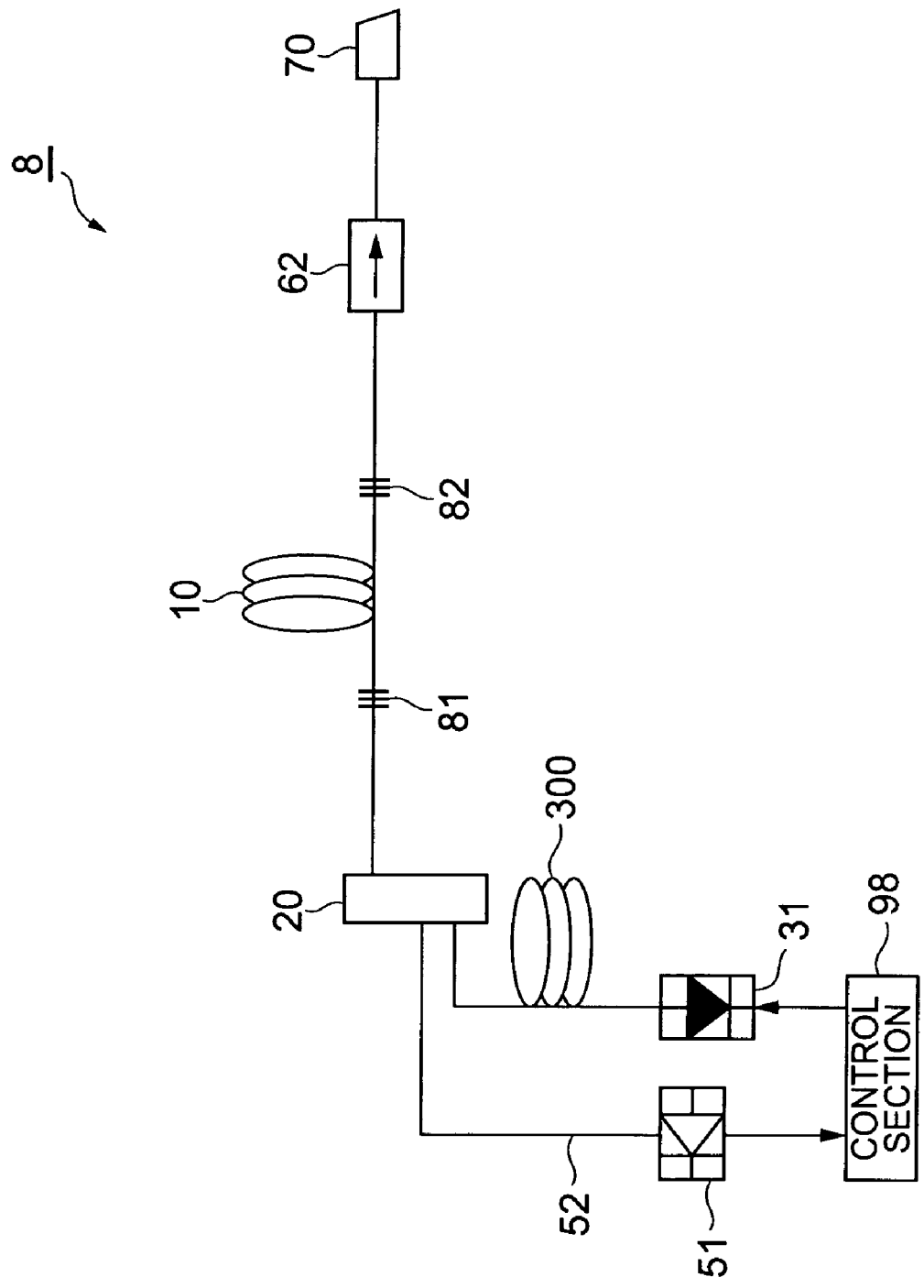
FIG. 15 shows the constitution of the optical module according to a third modified example as a modified example of each embodiment of the optical module according to the present invention.

In the optical modules 1 to 4 according to the first to fourth embodiments, the seed light outputted from the seed light source 41 is amplified in the amplification optical fiber 10 but the optical module according to the present invention may also have a constitution that implements lasing by means of a resonator structure as shown in FIG. 15.

FIG. 15 shows the constitution of an optical module according to a third modified example as a modified example of each embodiment of the optical module according to the present invention. The optical module 8 according to the third modified example shown in FIG. 15 comprises the amplification optical fiber 10, the optical coupler 20, the pumping light source 31, the delay optical fiber 300, the photodetector 51, the optical fiber 52, the optical isolator 62, an optical fiber lag grating 81, an optical fiber lag grating 82, and a control section 98. However, the optical module 8 does not comprise a seed light source.

The optical fiber lag grating 81 is provided at one end of the amplification optical fiber 10 and the optical fiber lag grating 82 is provided at the other end of the amplification optical fiber 10. The optical fiber lag gratings 81 and 82 constitute a Fabry-Perot resonator and the amplification optical fiber 10 is disposed on the resonance path.

The pumping light outputted from the pumping light source 31 reaches the optical fiber lag grating 81 after passing through the delay optical fiber 300 and optical coupler 20. In addition, the pumping light is supplied to the amplification optical fiber 10 after being transmitted by the optical fiber lag grating 81 and pumps the rare earth element with which the amplification optical fiber 10 is doped. Further, the light that is emitted from the amplification optical fiber 10 in response to the pumping is subjected to lasing by the resonator. The lasing light that is transmitted by the optical fiber lag grating 82 passes through the optical isolator 62 before being outputted toward the outside from the light emission end 70.

The reflected light (return light) that is generated upstream of the entry end of the optical isolator 62 is split by the optical coupler 20 and introduced not only to the pumping light source 31 but also the photodetector 51. Therefore, a countermeasure such as stopping or reducing the output of the pumping light of the pumping light source 31 when return light is detected by the photodetector 51 is adopted by the control section 98. As a result, the entry of the return light to the pumping light source 31 is suppressed and the pumping light source 31 can be protected.

As per the case of the first embodiment, the optical module 8 according to the third modified example shown in FIG. 15 above stops the output of the pumping light from the pumping light source 31 or reduces the intensity thereof when the power of the return light detected by the photodetector 51 is greater than a predetermined value. Furthermore, as per the case of the second embodiment, the optical module 8 according to the third modified example may turn OFF the light propagation of the optical device 33 provided between the pumping light source 31 and the delay optical fiber 300 when the power of the return light detected by the photodetector 51 is greater than a predetermined value.

As described above, the present invention makes it possible to implement a structure for protecting the pumping light source at a low cost.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical module comprising:
   an amplification optical fiber amplifying seed light with a predetermined wavelength which propagates therethrough, while being supplied with pumping light therein;
   a pumping light source outputting the pumping light to be supplied to said amplification optical fiber;
   an optical coupler disposed between said amplification optical fiber and said pumping light source, said optical coupler having a common port connected to one end of said amplification optical fiber, and a plurality of optical input/output ports each of which functions as an optical output port when said common port functions as an optical input port but functions as an optical input port when said common port functions as an optical output port;
   a delay optical fiber applying a delay time to the pumping light outputted from said pumping light source, said delay optical fiber having one end optically connected to said pumping light source, and another end optically connected to a first port among said plurality of optical input/output ports of said optical coupler;
   a photodetector optically connected to a second port among said plurality of optical input/output ports of said optical coupler; and
   a control section controlling at least one of an intensity of the seed light and an intensity of the pumping light inputted to said delay optical fiber, on a basis of a detection result of said photodetector.

2. An optical module according to claim 1, wherein a difference between an optical path length, which includes said delay optical fiber, from said optical coupler to said pumping light source and an optical path length from said optical coupler to said photodetector is one meter or more.

3. An optical module according to claim 1, wherein said delay optical fiber delays a part of return light reaching said pumping light source such that a timing with which the part of the return light generated within said amplification optical fiber reaches said pumping light source via said optical coupler lags a timing with which a part of return light generated within said amplification optical fiber reaches said photodetector via said optical coupler.

4. An optical module according to claim 1, wherein said control section controls said pumping light source such that, when a power of light detected by said photodetector is greater than a predetermined value, an output of the pumping light from said pumping light source is stopped or an intensity of the pumping light from said pumping light source is reduced, and wherein said delay optical fiber applies a delay time, which is longer than a time required from a timing of the light detection by said photodetector until a timing of a start of output control of said pumping light source by said control section, to the pumping light outputted from said pumping light source.

5. An optical module according to claim 1, further comprising an optical device provided between said pumping light source and said delay optical fiber, said optical device switching the propagation and blocking of light between said pumping light source and said delay optical fiber, wherein said control section controls said optical device so as to make light propagate between said pumping light source and said delay optical fiber when a power of light detected by said photodetector is greater than a predetermined value, and wherein said delay optical fiber applies a delay time, which is longer than a time required from a timing of the light detection by said photodetector until a timing of the start of the switching control of said optical device by said control section, to the pumping light outputted from said pumping light source.

6. An optical module according to claim 1, further comprising a seed light source outputting the seed light, wherein said control section controls said seed light source such that, when a power of light detected by said photodetector is greater than a predetermined value, an output of the seed light from said seed light source is stopped or an intensity of the seed light from said seed light source is reduced, and wherein said delay optical fiber applies a delay time, which is longer than a time required from a timing of the light detection by said photodetector until a timing of the start of output control of said seed light source by said control section, to the pumping light outputted from said pumping light source.

7. An optical module according to claim 1, further comprising: a seed light source outputting the seed light; and a modulator directly modulating or externally modulating the seed light from said seed light source, wherein said control section controls the modulator such that, when a power of light detected by said photodetector is greater than a predetermined value, a modulation operation is stopped, and wherein said delay optical fiber applies a delay time, which is longer than a time required from a timing of the light detection by said photodetector until a timing of the stoppage of application voltage modulation of said seed light source by said control section, to the pumping light outputted from said pumping light source.

* * * * *